(12) United States Patent
Zhang et al.

(10) Patent No.: US 8,352,767 B2
(45) Date of Patent: Jan. 8, 2013

(54) INTELLIGENT AND ADAPTIVE METHOD TO MANAGE MOBILE DEVICE POWER

(75) Inventors: Chi Zhang, Fresh Meadows, NY (US); Charles Bolen, Kings Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 493 days.

(21) Appl. No.: 12/324,157

(22) Filed: Nov. 26, 2008

(65) Prior Publication Data

US 2010/0131790 A1     May 27, 2010

(51) Int. Cl.
*G06F 1/32*     (2006.01)
(52) U.S. Cl. .............. 713/321; 713/323; 455/127.5; 706/12; 706/14

(58) Field of Classification Search .............. 713/321, 713/323; 455/127.5; 706/1, 12, 14, 15
See application file for complete search history.

(56) References Cited

U.S. PATENT DOCUMENTS

| 5,099,235 | A | * | 3/1992 | Crookshanks | ............... 455/13.1 |
| 5,842,027 | A | * | 11/1998 | Oprescu et al. | ............... 713/300 |
| 7,155,625 | B2 | * | 12/2006 | Cohen et al. | ............... 713/340 |
| 7,565,562 | B2 | * | 7/2009 | Chary | ............... 713/324 |
| 2005/0239518 | A1 | | 10/2005 | D'Agostino | |

* cited by examiner

*Primary Examiner* — Thuan Du

(57) ABSTRACT

The invention relates to systems and or methodologies for intelligent and adaptive power management in mobile devices. A peripheral power management component can set peripheral devices to active or inactive based on one or more schemas. The schemas can be predetermined or generated by the peripheral power management component. In addition, an adaptive component can modify the schemas to reflect actual usage or changing trends for each peripheral device.

20 Claims, 9 Drawing Sheets

INTELLIGENT AND ADAPTIVE METHOD TO MANAGE MOBILE DEVICE POWER

BACKGROUND

Mobile communication technologies have experienced significant growth over the past several years. This growth has lead to mobile systems of increased sophistication and complexity. Additionally, the current generation of peripheral devices that can be associated with the mobile devices have also become more functional and intelligent. Modern mobile communication systems and peripheral devices offer tremendous computing power and convenience.

The ability to utilize a plurality of peripheral devices with mobile devices has led to increased commercial and consumer functionality for mobile devices. Mobile devices can now complete task that were the sole domain of much larger computers just a few years ago. However, communicating with and/or powering the peripheral devices can require relatively large amounts of power considering the size of mobile devices.

Constantly powering and/or communicating with peripheral devices can deprive a mobile device of power that may be better utilized by other resources. In addition, typical power management techniques can be highly inefficient. Therefore, it would be desirable to have a power management system that could intelligently and adaptively distribute power from the mobile device to the peripheral devices.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In a first embodiment, disclosed is a system that facilitates power management in mobile devices, including a power source that provides power for at least one of powering a set of peripheral devices, or maintaining communication with the peripheral devices. In addition, a peripheral power management component manages the power expended by the power source by at least one of: setting a state for at least one of the peripheral devices, or maintaining communication with at least one of the peripheral devices, based on a set of observed attributes and at least one peripheral device power management schema for each peripheral device.

In another embodiment, a method for facilitating power management in mobile devices is disclosed. The method includes providing power for at least one of: powering a set of peripheral devices, or communicating with the peripheral devices. Additionally, managing the power by at least one of: determining a state of at least one of the peripheral devices or maintaining communication with at least one of the peripheral devices based on a set of observed attributes and at least one peripheral device power management schema.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
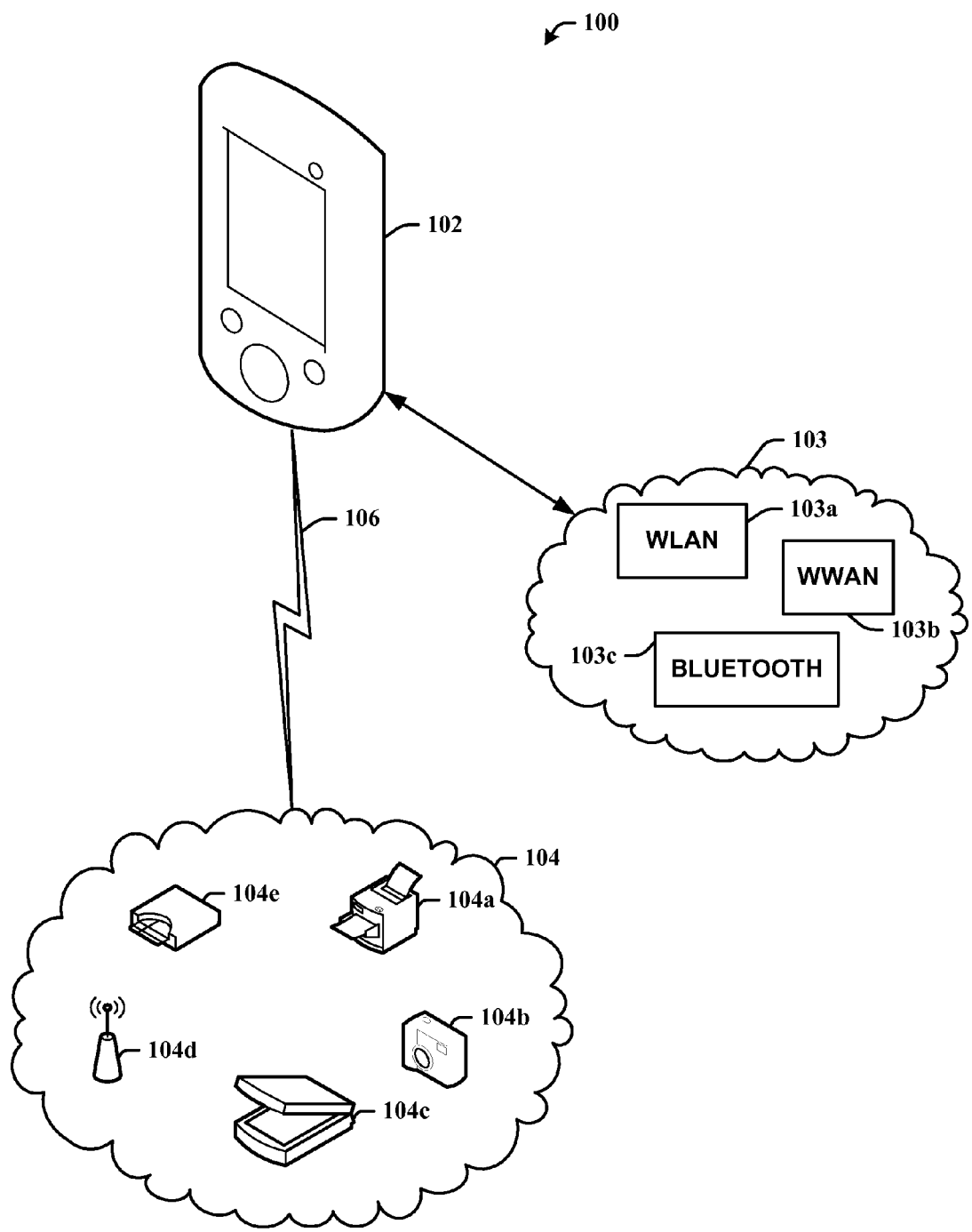
FIG. 1 illustrates an example mobile system in accordance with an aspect the subject specification.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

FIG. 1 illustrates an example mobile communication system 100 in accordance with an aspect the subject innovation. The system 100 includes a mobile device 102, a set of internal peripheral devices 103, and a set of external peripheral devices 104. The mobile device 102 can include devices such as cell phones, smart phones, laptops, handheld communication devices, handheld computing devices, satellite radios, global positioning systems, PDAs, and so forth. The internal peripheral devices 103 can be built-in to the mobile device 102, and can include a plurality of devices such as a wireless local area network (WLAN) radio 103a, a wireless wide area network (WWAN) radio 103b, a Bluetooth radio 103c, and so forth.

In addition, the mobile device 102 is in communication with the external peripheral devices 104 via a communication link 106. The communication link 106 can be a wireless communication link, a wired communication link, or a physical connection between the mobile device 102 and the external peripheral devices 104. The external peripheral devices 104 can include most any of a plurality of peripheral devices that can be used with a mobile device 102, including but not limited to a printer 104a, a camera 104b, a scanner 104c, a radio connection 104d (e.g. WWAN, Wi-Fi, Bluetooth, etc.), a card reader 104e, and so forth. It is to be appreciated that the illustration contains but a few examples of peripheral devices for simplicity and ease of explanation, and a plurality of external and internal peripheral devices are possible within the scope and spirit of the current innovation.

In operation, one or more internal peripheral devices 103 can be powered via the mobile device 102, and one or more external peripheral devices 104 can be connected, associated, or otherwise in communication with the mobile device 104. For example, the printer 104a can be wirelessly connected to the mobile device 102 via the mobile devices Bluetooth radio 103c, wherein the mobile device 102 can send or transmit documents, photographs, and so forth to the printer 104a. Additionally or alternatively, the mobile device 102 may automatically connect to one or more of the peripheral devices 104 when in range. A constant or persistent connection between the mobile device 102 and the external peripheral devices 104 requires power from the mobile device 102 to maintain the communication, and can lead to inefficiencies in power management, wherein the mobile device 102 may not always require access to the external peripheral devices 104. Furthermore, the mobile device 102 may not need to constantly power the internal peripherals 103, such as the Bluetooth radio 103c, when they are not in use.

Figure 2:
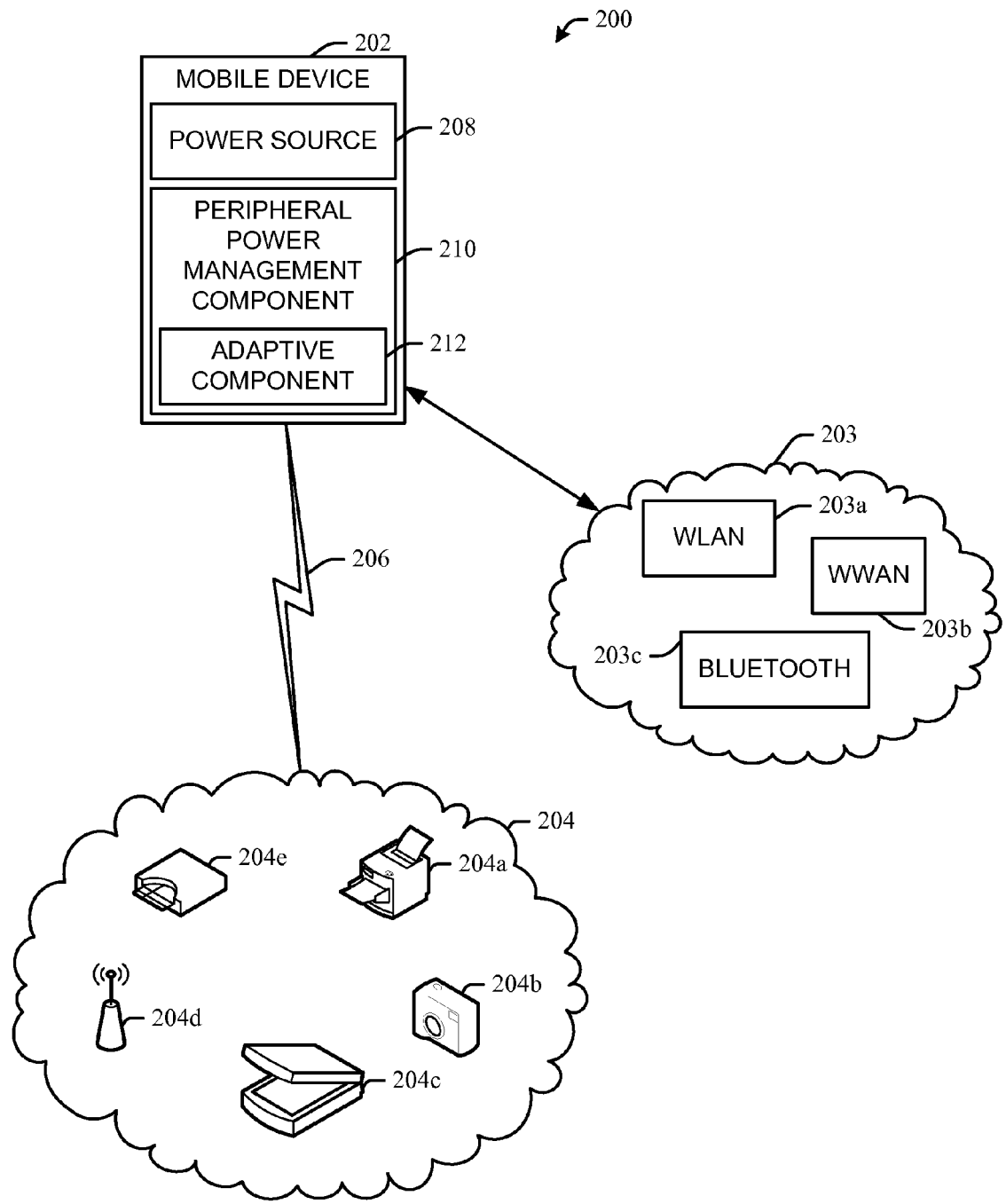
FIG. 2 illustrates an example system for intelligent and adaptive mobile device power management in accordance with an embodiment of the subject specification.

FIG. 2 illustrates an example mobile communication system 200 in accordance with an aspect the subject innovation. The system 200 includes a mobile device 202, a set of internal peripheral devices 203, and a set of external peripheral devices 204. As discussed previously, the mobile device 202 can include devices such as cell phones, smart phones, laptops, handheld communication devices, handheld computing devices, satellite radios, global positioning systems, PDAs, and so forth. The mobile device 202 can contain a plurality of internal peripherals 203, and can be in communication with the external peripherals 204 via a communication link 206. The communication link 206 can be a wireless communication link, a wired communication link, or a physical connection (e.g. built in the mobile device, attached, etc.) between the mobile device 202 and the peripheral devices 204.

The mobile device 202 includes a power source 208, and a peripheral power management component 210. The power source 208 can include most any method of providing power (e.g. voltage and current) to the mobile device 202, such as a battery pack. The power source 208 provides power to the mobile device 202, and the internal peripherals 203. In addition, the power source 208 provides the power required to communicate with one or more external peripherals 204.

For example, if the mobile device 202 is connected to the printer 204a, the power source 208 provides the power necessary to maintain the connection, as well as power required to transmit data (e.g. documents, photographs, etc.) to the printer 204a. Additionally or alternatively, the power source 208 can provide power to one or more internal or external peripherals 203, 204. For instance, if one or more external peripherals 204 communicate with the mobile device 202 via a wired or physical connection, then the power source 208 can also provide power to the peripheral devices 204. Constantly maintaining a connection with external peripherals 204 and/or powering internal and/or external peripherals 203, 204 can unduly deplete the power source 208.

The peripheral power management component 210 (peripheral component) can manage the power used by the peripheral devices 203, 204 by setting a state (e.g. active or inactive) for one or more peripheral devices 203, 204 based on one or more power management schemas. The peripheral component 210 can have a plurality of power management schemas, including but not limited to preset power management schemas, user defined power management schemas, and adaptive power management schemas. For example, the peripheral management component 210 can activate one or more peripheral devices 203, 204 based on a preset power management schema that assumes users typically activate certain peripheral devices 203 and/or 204 during business hours. The schema prevents the mobile device from unnecessarily draining the power source by maintaining communication with and/or powering the peripheral devices 203, 204 during periods when they are not typically used. It is to be appreciated that this is but one example, and a plurality of peripheral power management schemas are possible within the scope and spirit of the subject innovation.

As noted previously, the peripheral management component 210 also includes an adaptive component 212. The adaptive component 212 enables the peripheral component 210 to determine one or more adaptive power management schemas. The adaptive power management schema can learn, ascertain, or otherwise determine one or more tendencies regarding usage of peripheral devices. For instance, a user may only use the mobile device 202 with one or more peripheral devices 203, 204 on Saturdays and Sundays. An adaptive power management schema can determine the user's tendencies, and only activate the peripheral devices on Saturdays and Sundays 203, 204. Consequently, the mobile device 202 can avoid unnecessarily draining the power source 208 by remaining constantly connected to and/or powering the peripheral devices 203, 204.

The adaptive component 212 can ascertain user tendencies via a plurality of methods (discussed infra). For example, the adaptive component 212 can employ a background learning application for a period of time, wherein the application tracks the usage of the peripheral devices 203, 204. Based on the tracked usage data the adaptive component 212 can determine an adaptive power management schema. Additionally or alternatively, the adaptive component 212 can account for user overrides of a preexisting schema, and modify the schema to reflect the user's tendencies. For example, the peripheral component 210 can have a preexisting power management schema that only activates the peripheral devices 203, 204 during business hours. However, the user consistently overrides the schema on Wednesday nights. The adaptive component 212 can modify the schema to activate the peripheral devices 203, 204 based on the user's tendencies, such as activating the peripheral devices 203, 204 during business hours and Wednesday nights.

Figure 3:
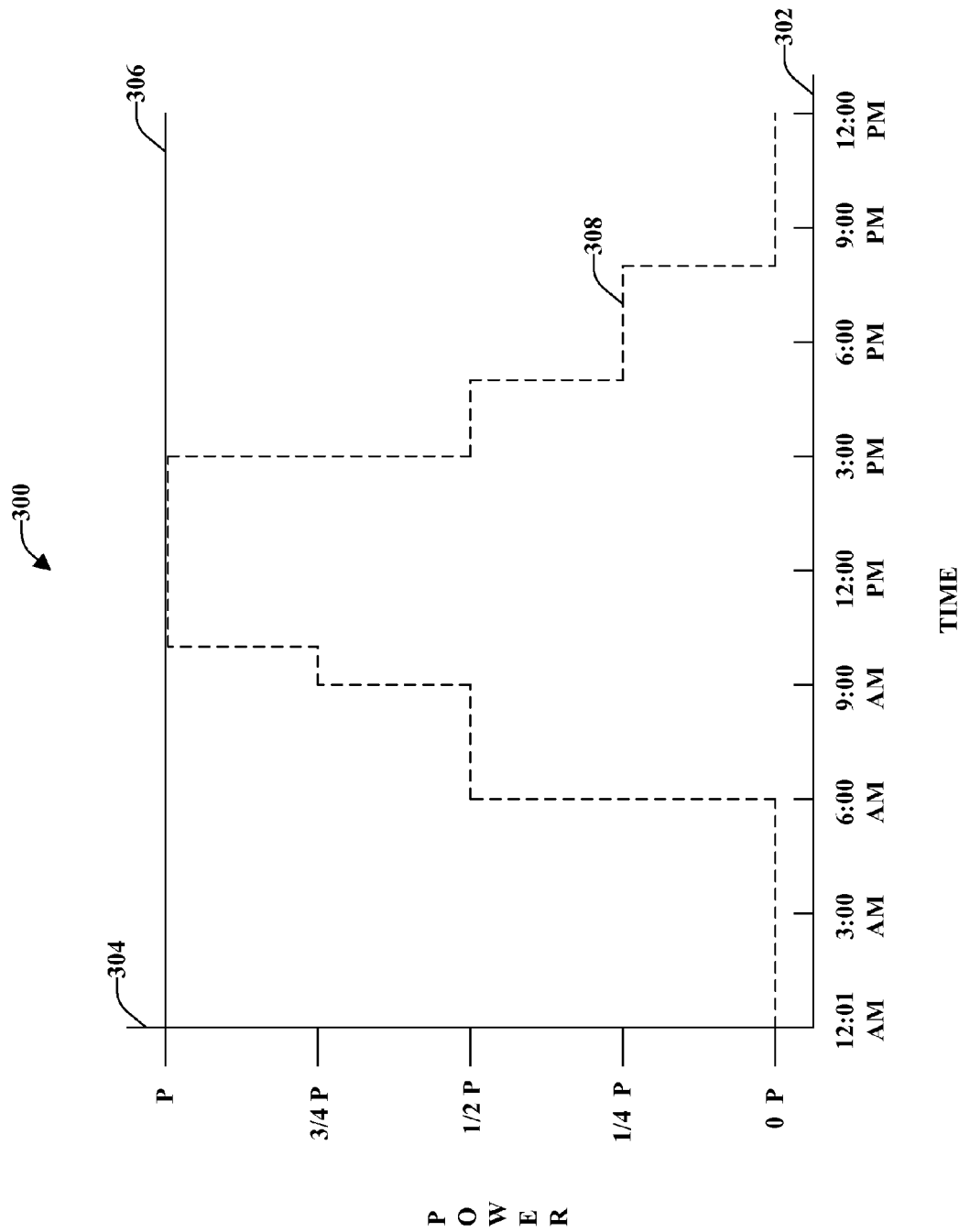
FIG. 3 is an example graph illustrating the difference between actual power usage and required power usage of a mobile device in accordance with an embodiment of the subject specification.

FIG. 3 is an example graph illustrating actual power consumed compared to required power by a mobile device for peripheral devices. The graph 300 illustrates the power used by an example mobile device for an example set of peripheral devices during the course of an example day. The x-axis (e.g. horizontal axis) 302 represents the time of day, and the y-axis (e.g. vertical axis) 304 represents the power used by the mobile device at a given time. The plot 306 illustrates a typical (e.g. without user interference) mobile device that will provide P power, wherein P is the power necessary to maintain communication with and/or power one or more associated peripheral devices. For example, the mobile device may be associated with a first, second, third, and fourth peripheral device, wherein each device requires ¼ P power. Typically, the mobile device will continuously provide power to each of the four peripheral devices. Consequently, the mobile device constantly expends P power throughout the day to maintain the connection, regardless of actual usage of each of the four peripheral devices.

The plot 308 illustrates the power required from the mobile device based on actual usage of the peripheral devices. During different times of the day the power required from the mobile device for the peripheral devices can vary. For example, from midnight until 6:00 am the mobile device user may be asleep, and each of the four peripheral devices discussed in the prior example may be unused requiring 0 P. At 6:00 am (when the user begins the day), they may use the mobile device in conjunction with the first and second peripheral devices requiring ½ P (e.g. ¼ P×2). At 9:00 AM the user may also begin using the third peripheral device, and shortly thereafter during the height of the business day the user may need all four peripheral devices simultaneously requiring P power. As the day comes to a close, the user may require less peripheral devices, and as a consequence less power is required from the mobile device. At slightly before 9:00 pm the user may not need any of the peripheral devices for the remainder of the day, and 0 P is required from the mobile device. It is to be appreciated that this is but one example used for simplicity and ease of explanation. For example, there can be most any number of peripheral devices, and each peripheral device can have different power consumption characteristics.

The graph 300 clearly demonstrates the difference between the power actually used by the mobile device, and the power required from the mobile device. The example scenario illustrates that significant power savings can be achieved by managing peripheral device power based on necessity.

Figure 4:
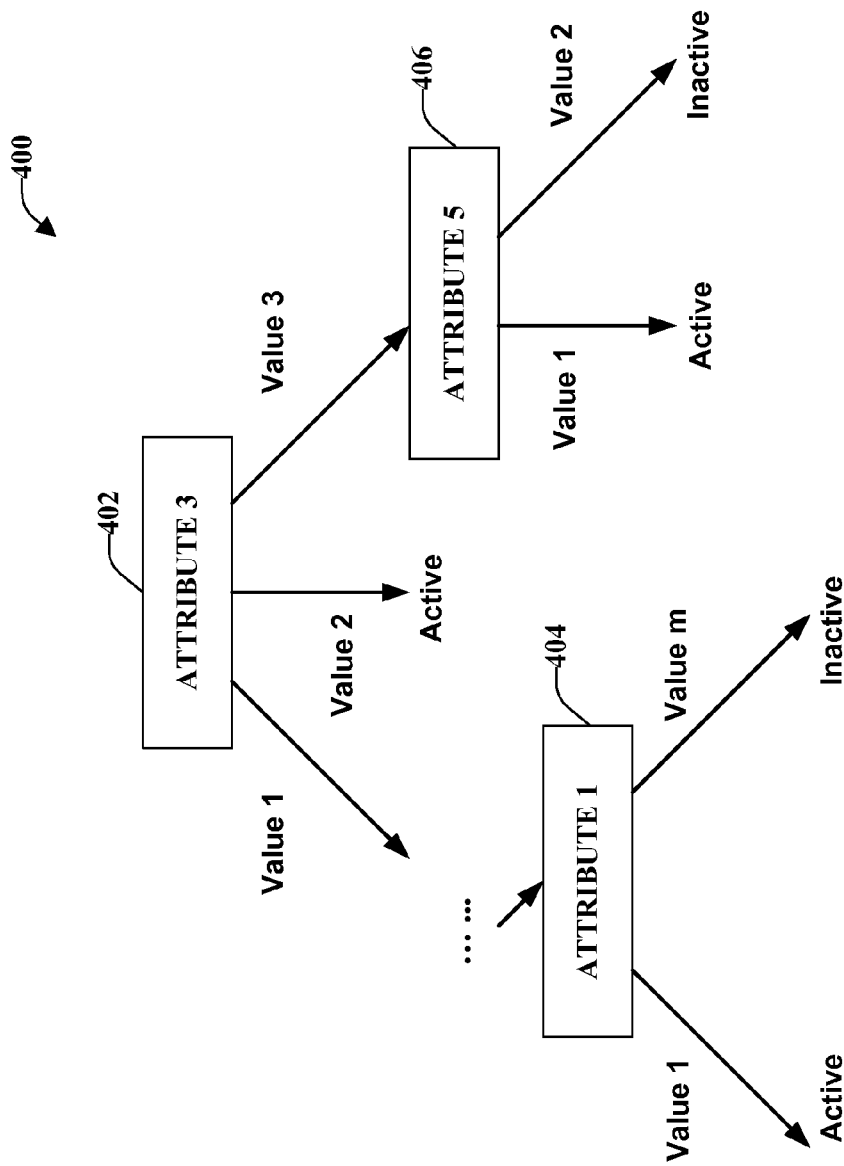
FIG. 4 illustrates an example decision tree for one or more peripheral devices in accordance with an aspect of the subject specification.

FIG. 4 illustrates an example decision tree for one or more peripheral devices in accordance with an aspect of the subject innovation. As previously discussed, a mobile device can activate and/or deactivate one or more peripheral devices based on one or more schemas (See FIG. 2). The schemas can be predetermined and/or adaptive. For example, the mobile device can employ an application to monitor, track, or otherwise determine peripheral device states. The mobile device can log the device states in a matrix as shown below in the example Matrix 1.

| | | | | | Peripheral Device 1 | Peripheral Device 2 | | |
|---|---|---|---|---|---|---|---|---|
| Attribute 1 (Day of week) | Attribute 2 (Time of day) | Attribute 3 (Active application) | ... | Attribute n | (WWAN radio) | (WLAN radio) | ... | Peripheral Device m |
| Week day | Morning | Application A | | Value1 | Active | Active | | Inactive |
| Week day | Afternoon | Application B | | Value2 | Active | Inactive | | Active |
| ... | ... | ... | ... | ... | ... | ... | ... | ... |
| Weekend | Evening | Application C | | Value3 | Inactive | Active | | Inactive |
| Weekend | Morning | Application C | | Value4 | Inactive | Inactive | | Inactive |

Matrix 1

The mobile device can track N attributes, where N is an integer. For example, as shown in Matrix 1 the mobile device can track a day of the week (e.g. Monday, Weekday, Weekend, etc.), a time of day, an active application, and so forth. In addition, the mobile device can monitor the state of M peripheral devices, where m is an integer. As shown in Matrix 1, a first peripheral device 1 can be a wireless wide area network (WWAN) radio, and the WWAN radio is active on a weekday morning along with application A, and so forth. It is to be appreciated that there are a plurality of techniques that can be used to determine the state of one or more peripheral devices, and a Matrix is but one example possible within the scope and spirit of the subject innovation.

The mobile device can construct, compose, or otherwise determine one or more decision trees based on analyzing the information gain of attributes in the matrix (e.g. Matrix 1). The decision tree 400 illustrates the manner in which the mobile device can determine to activate and/or deactivate a peripheral device. For example, the decision tree 400 could be a decision tree for activating peripheral device 1 (e.g. WWAN radio). At 402, the mobile device analyzes a first attribute (e.g. attribute 3). Using the previous examples, attribute 3 is the active application. If the value 1 is true, such as a particular application being active, then the mobile device proceeds along the decision tree until ultimately reaching 404. At 404, the mobile device analyzes an $N^{th}$ (e.g. attribute 1). Referring to matrix 1, attribute 1 is the day of the week. Clearly, there are a plurality of options for the day of the week, for example Value 1 can be Monday wherein Value M is Sunday. The mobile device sets peripheral device 1 to active or inactive based on the value of attribute 1.

Alternatively, at 402 if the application corresponding to value 2 is active then the mobile device can activate peripheral device 1. However, if the application corresponding to value 3 is active, then the mobile device proceeds to 406 in the decision tree. At 406, the mobile device analyzes a third attribute (e.g. attribute 5). If value 1 is true for the third attribute then the mobile device can activate peripheral device 1, and if value 2 is true for the third attribute then the mobile device can deactivate peripheral device 1. It is to be appreciated that this is but a single example, and a plurality of attributes and peripheral devices are possible within the scope and spirit of the subject innovation.

Figure 5:
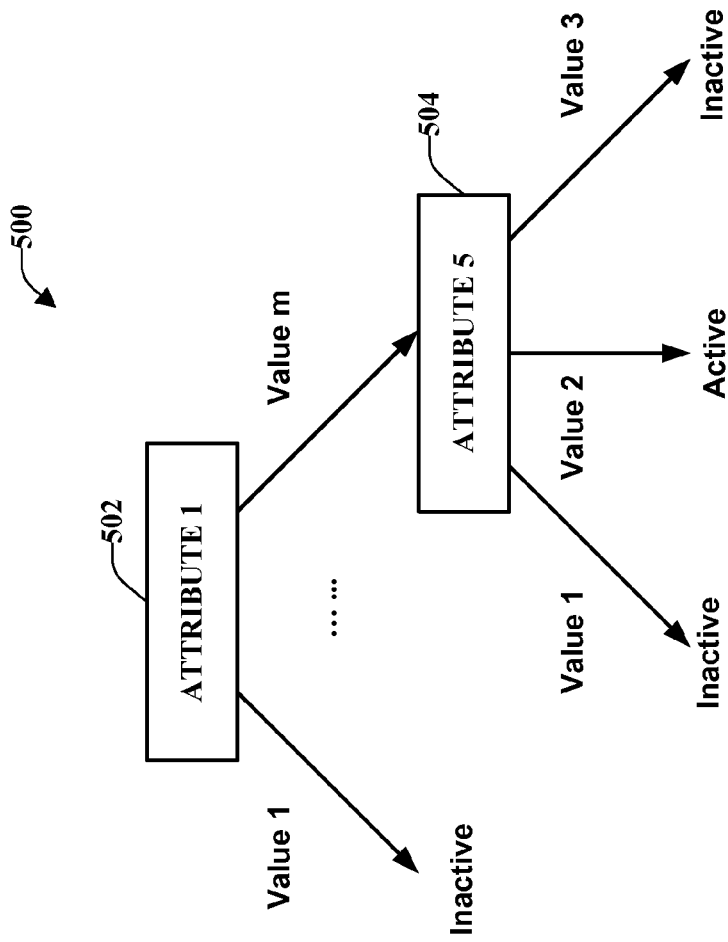
FIG. 5 illustrates an example decision tree for power management in accordance with an aspect of the subject specification.

Referring now to FIG. 5, another example decision tree for power management is illustrated in accordance with an aspect of the subject specification. The decision tree 500 is illustrative of a decision tree that can be used to activate and/or deactivate a second peripheral device, such as a wireless local area network (WLAN) radio. At 502, a mobile device analyzes a first attribute (e.g. attribute 1). If value 1 is true, the mobile device will set the peripheral device to inactive, and if value M is true then the mobile device proceeds to 504. It is to be appreciated that the decision tree is illustrated as shown for simplicity and clarity of explanation.

As in the prior examples, the first attribute can be a day of the week, wherein the mobile device deactivates the peripheral device if value 1 is true, wherein value 1 could be Sunday and the mobile device has determined that the peripheral device is not required on Sundays. At 504, the mobile device analyzes a second attribute (e.g. attribute 5), and based the value of attribute 5 the mobile device can set the peripheral device to active or inactive. For example, attribute 5 could be a calendar, wherein different user states are defined, such as busy, in a meeting, free, and so forth. The mobile device can activate the peripheral device based on a value of the user's state as defined in the calendar at 504. It is to be appreciated that a decision tree is but one example of artificial intelligence/machine learning that can be employed within the scope and spirit of the subject innovation. For example, other artificial intelligence techniques can include but are not limited to naïve Bayes, Bayesian networks, neural networks, fuzzy logic models, and probabilistic classification models providing different patterns of independence.

Figure 6:
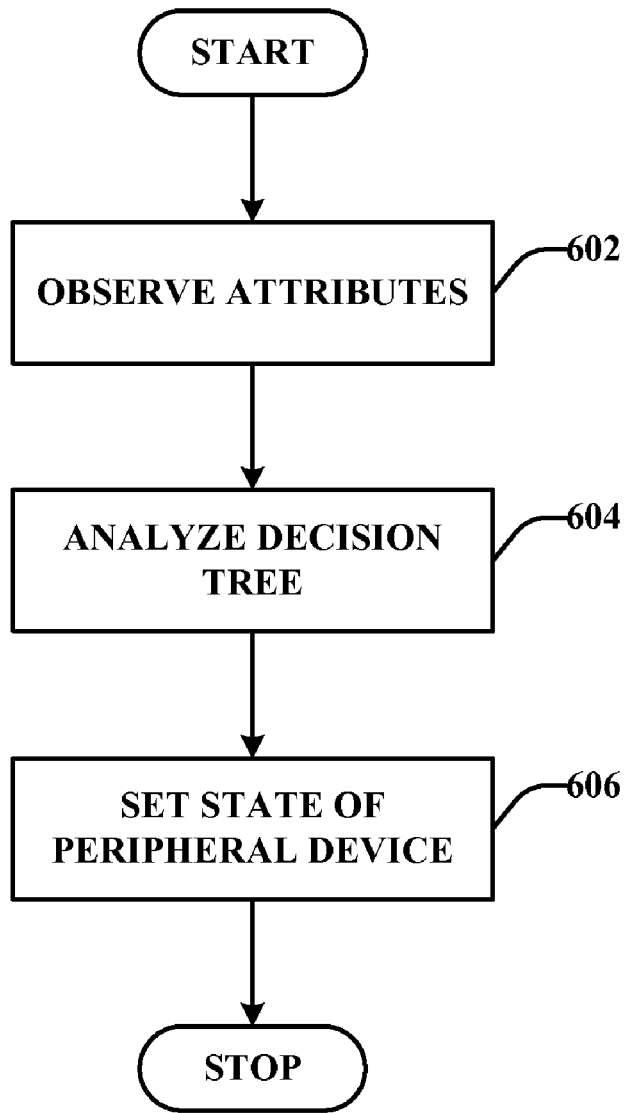
FIG. 6 illustrates an example method for facilitating power management in mobile devices in accordance with an aspect of the subject specification.
Figure 7:
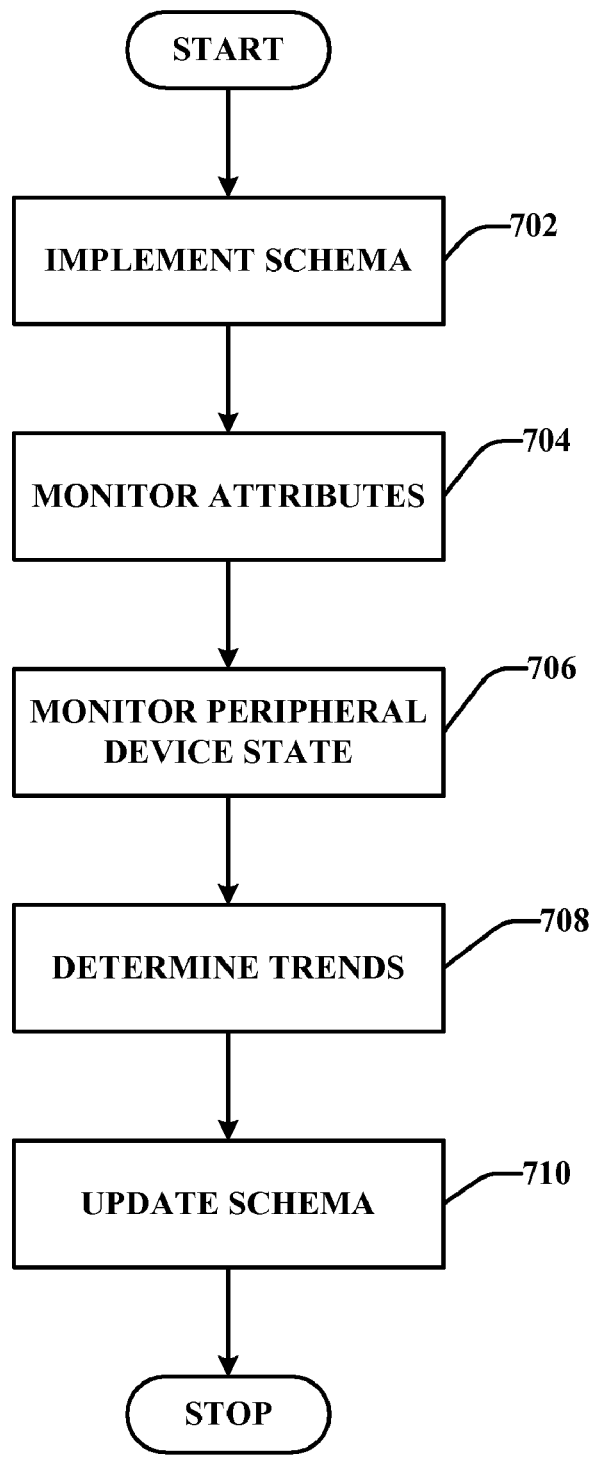
FIG. 7 illustrates an example method for adapting power management schemas for mobile devices in accordance with an aspect of the subject specification.
Figure 8:
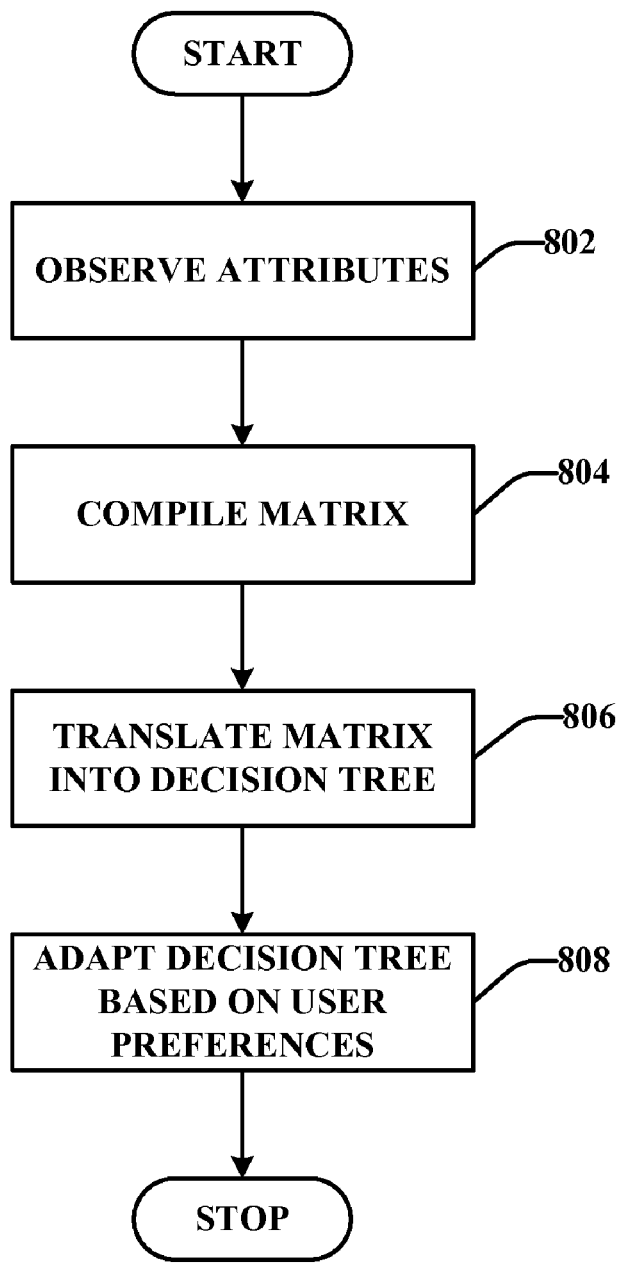
FIG. 8 illustrates an example method for learning and creating power management schemas for mobile devices in accordance with an aspect of the subject specification.

In view of the exemplary systems and techniques described supra, a methodology that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

FIG. 6 illustrates an example method of facilitating power management in mobile devices in accordance with an aspect of the subject innovation. At 602, one or more attributes of a mobile device are observed. Most any of a plurality of attributes can be observed and used to facilitate power management in the mobile device. For example, the observable attributes include, but are not limited to the applications that are running on the mobile device, the time and date according to the mobile device, the state of one or more associated peripheral devices, a location of the mobile device, and so forth.

At 604, the observations are used to reach one or more decisions regarding peripheral device management via a tree diagram (e.g. decision tree). As previously discussed (See FIGS. 4-5), the observed attributes can be used as conjunctions that lead to classifications and/or decisions, such as activating and/or deactivating one or more peripheral devices. For example, the decision tree can direct the mobile device to activate a peripheral device if the observed value for the day of the week is a weekday.

At 606, a state is determined and set for one or more peripheral devices based on the analysis of the decision tree at 604. For example, the decision tree may state that if a first attribute is occurring (e.g. true), but a second attribute is not occurring (e.g. false), then a first peripheral device should be set to active. It is to be appreciated that this is but one example, and the current innovation is not limited to decision trees for decision making, rather a plurality of logic mechanisms may be employed within the scope and spirit of the subject innovation.

FIG. 7 illustrates an example method for adapting power management schemas for mobile devices in accordance with an aspect of the subject innovation. As discussed supra, a power management schema can be updated, modified, or otherwise adapted to changing or actual use scenarios. For example, a mobile device may employ a predetermined power management schema to set the state of one or more peripheral devices as active or inactive. However, the actual use of one or more of the peripheral devices may be different than that prescribed by the schema. The current innovation provides for modifying the schema to reflect such usage.

At 702, a peripheral device power management schema is implemented to make efficient use of a mobile device's resources by activating and/or deactivating one or more peripheral devices based on necessity. For example, the mobile device may not require access to certain peripheral devices in a set of peripheral devices associated with the mobile device during various times of the day, days of the week, and so forth. Consequently, the peripheral devices can be set to active or inactive as required under the schema. The schema can include most any logic mechanism for determining the state of the peripheral devices, including but not limited to a decision tree.

At 704, one or more attributes are tracked, logged, or otherwise monitored to determine deviation from the schema. For example, the schema may contain instructions for the mobile device to set a first peripheral device to inactive if a first and second attribute have a predetermined value X. At 706, the state of one or more peripheral devices are monitored. Continuing with the previous example, the state of the first peripheral device is monitored. The attributes and peripheral devices can be monitored continuously, at predetermined intervals, or upon the occurrence of a predetermined event.

At 708, the logged observations of the value of the attributes is compared to the logged observations of the peripheral device states, and one or more trends can be determined. For example, if the first peripheral device is typically active when the first and second attribute have the predetermined value X, then a trend can be determined regarding the first peripheral device in relation to the first and second attributes having the predetermined value.

At 710, the schema is updated based on one or more observed trends. For example, the schema can be updated to reflect the determined trend regarding the first peripheral device in relation to the first and second attributes having the predetermined value. In this way, the peripheral device power management schema can adapt to changing user and/or mobile device preferences.

FIG. 8 illustrates an example method for learning and creating power management schemas for mobile devices in accordance with an aspect of the subject innovation. As previously discussed, one or more power management schemas can be created based on typical or desired peripheral device usage. At 802, one or more attributes are observed. The attributes can be observed via a background application running on mobile device for a predetermined period of time. For example, the background application may track the attributes during an initialization phase when the mobile device is originally activated. Additionally or alternatively, the application can continuously track the attributes, or can be activated by a user or the mobile device as desired.

At 804, a matrix is compiled based on the observed attributes. The matrix can have various levels of granularity, and can include a plurality of attributes. For example, a first attribute may be a day, wherein the day can be expressed as weekdays compared to weekends, or the specific day of the week, such as Monday. At 806, the matrix is translated into a set of logic devices, such as a decision tree. As previously discussed, the decision tree facilitates the mobile device in setting the state of one or more peripheral devices. Additionally or alternatively, the matrix could be translated into a plurality of other logical devices such as a probability table, wherein the mobile device can set the state of the peripheral devices based on the probability of an event above or below a threshold.

At 808, the decision tree is adapted based on user or mobile device preferences or trends. As previously discussed, the attributes and peripheral device states can be monitored, and the schema updated to reflect actual usage requirements. It is to be appreciated that the foregoing is but one example of creating a peripheral device management schema, and a plurality of techniques are possible within the scope and spirit of the subject innovation.

Figure 9:
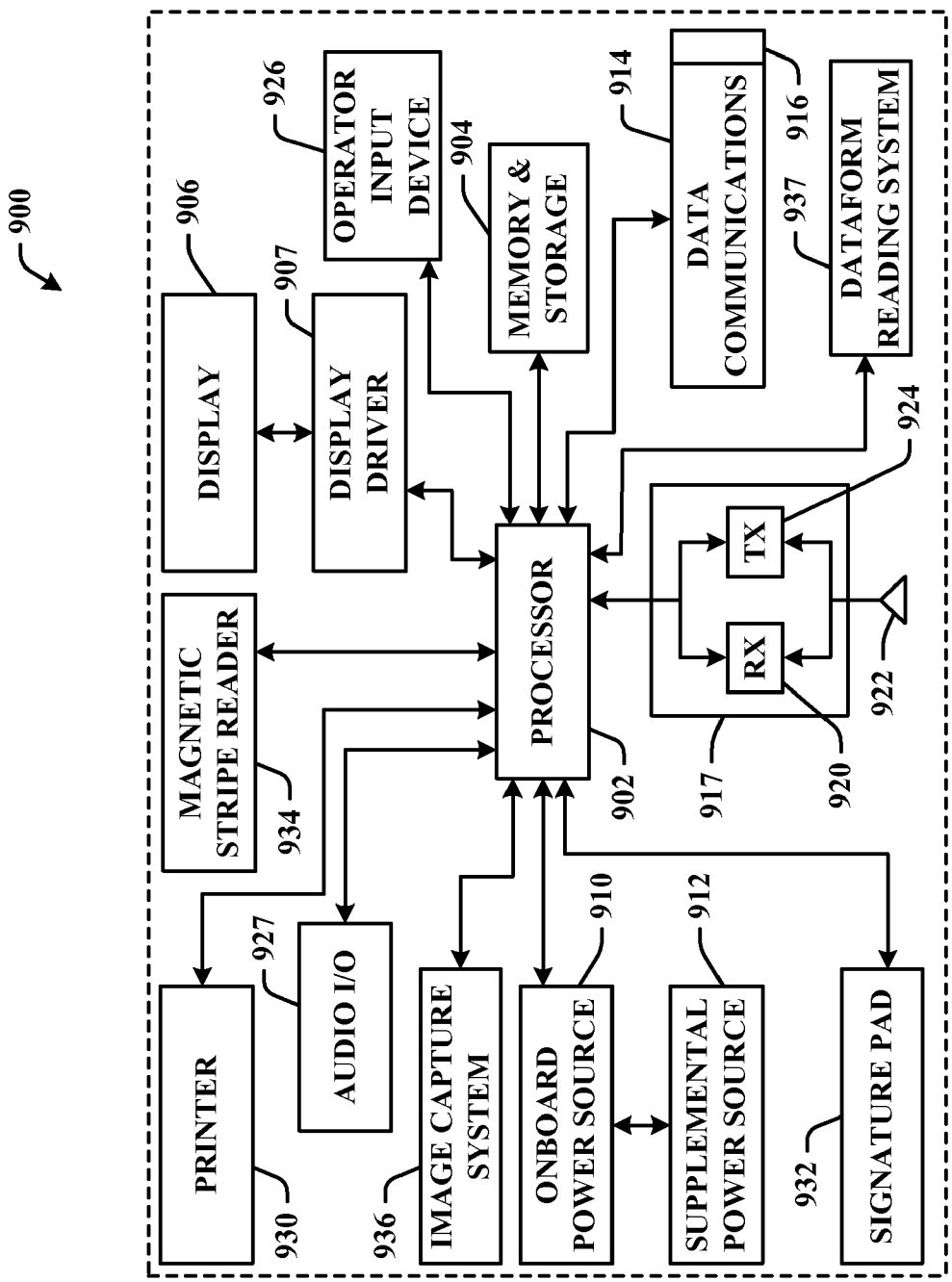
FIG. 9 illustrates an exemplary device operative to execute the one or more embodiments disclosed herein.

Referring now to FIG. 9, illustrated is a schematic block diagram of a portable hand-held terminal device 900 according to one aspect of the invention, in which a processor 902 is responsible for controlling the general operation of the device 900. The processor 902 is programmed to control and operate the various components within the device 900 in order to carry out the various functions described herein. The processor 902 can be any of a plurality of suitable processors. The manner in which the processor 902 can be programmed to carry out the functions relating to the invention will be readily apparent to those having ordinary skill in the art based on the description provided herein.

A memory 904 connected to the processor 902 serves to store program code executed by the processor 902, and serves as a storage means for storing information such as user credential and receipt transaction information and the like. The memory 904 can be a nonvolatile memory suitably adapted to store at least a complete set of the information that is displayed. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information, and the processor 902 could include a program for alternating or cycling between various sets of display information.

A display 906 is coupled to the processor 902 via a display driver system 908. The display 906 can be a color liquid crystal display (LCD), plasma display, or the like. In this example, the display 906 is a ¼ VGA display with sixteen levels of gray scale. The display 906 functions to present data, graphics, or other information content. For example, the display 906 can display a set of customer information, which is displayed to the operator and can be transmitted over a system backbone (not shown). Additionally, the display 906 can display a variety of functions that control the execution of the device 900. The display 906 is capable of displaying both alphanumeric and graphical characters.

Power is provided to the processor 902 and other components forming the hand-held device 900 by an onboard power system 910 (e.g., a battery pack). In the event that the power system 910 fails or becomes disconnected from the device 900, a supplemental power source 912 can be employed to provide power to the processor 902 and to charge the onboard power system 910. The processor 902 of the device 900 induces a sleep mode to reduce the current draw upon detection of an anticipated power failure.

The terminal 900 includes a communication subsystem 914 that includes a data communication port 916, which is employed to interface the processor 902 with a remote computer. The port 916 can include at least one of Universal Serial Bus (USB) and IEEE 1394 serial communications capabilities. Other technologies can also be included, for example, infrared communication utilizing an infrared data port.

The device 900 can also include a radio frequency (RF) transceiver section 918 in operative communication with the processor 902. The RF section 918 includes an RF receiver 920, which receives RF signals from a remote device via an antenna 922 and demodulates the signal to obtain digital information modulated therein. The RF section 918 also includes an RF transmitter 924 for transmitting information to a remote device, for example, in response to manual user input via a user input device 926 (e.g., a keypad) or automatically in response to the completion of a transaction or other predetermined and programmed criteria. The transceiver section 918 facilitates communication with a transponder system, for example, either passive or active, that is in use with product or item RF tags. The processor 902 signals (or pulses) the remote transponder system via the transceiver 918, and detects the return signal in order to read the contents of the tag memory. In one implementation, the RF section 918 further facilitates telephone communications using the device 900. In furtherance thereof, an audio I/O section 928 is provided as controlled by the processor 902 to process voice input from a microphone (or similar audio input device) and audio output signals (from a speaker or similar audio output device).

In another implementation, the device 900 can provide voice recognition capabilities such that when the device 900 is used simply as a voice recorder, the processor 902 can facilitate high-speed conversion of the voice signals into text content for local editing and review, and/or later download to a remote system, such as a computer word processor. Similarly, the converted voice signals can be used to control the device 900 instead of using manual entry via the keypad 926.

Onboard peripheral devices, such as a printer 930, signature pad 932, and a magnetic strip reader 934 can also be provided within the housing of the device 900 or accommodated externally through one or more of the external port interfaces 916. The example peripheral devices described in this embodiment, including but not limited to the data communications 914, the printer 930, the signature pad 932, the MSR 934, and the dataform reading system 937 are examples of peripheral devices that can be intelligently and adaptively managed to improve the power usage of the mobile device 900. It is to be appreciated that these are but a few examples, and a plurality of peripheral devices are possible within the scope and spirit of the subject innovation.

The device 900 can also include an image capture system 936 such that the user can record images and/or short movies for storage by the device 900 and presentation by the display 906. Additionally, a dataform reading system 938 is included for scanning dataforms. It is to be appreciated that these imaging systems (936 and 938) can be a single system capable of performing both functions.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates power management in mobile devices, comprising:
   a power source that provides power to a processor for maintaining communication with a set of peripheral devices; and
   a peripheral power management component that tracks usage of at least one of the peripheral devices associated with a set of observed mobile device attributes including a status of at least one application and manages the power expended by the power source based on the tracked usage of the at least one of the peripheral devices by one of: maintaining communication with at least one of the peripheral devices and disabling communication with at least one of the peripheral devices, based on the set of observed mobile device attributes and at least one peripheral device power management schema.

2. The system of claim 1, wherein the peripheral power management component further sets a state of the peripheral device.

3. The system of claim 1, the power management schema includes artificial intelligence.

4. The system of claim 3, the artificial intelligence includes at least one of: a decision tree, a naïve Bayes, a Bayesian network, a neural network, a fuzzy logic model, or a probabilistic classification model providing different patterns of independence.

5. The system of claim 3, the peripheral power management component generates the decision trees based on a matrix, the matrix including at least one of: a set of observed mobile device attributes, or a set of observed peripheral device states.

6. The system of claim 1, the peripheral power management component further includes an adaptive component that modifies the power management schemas based on at least one of tracked usage of peripheral devices, predicted usages of the peripheral devices, or observed attribute values associated with peripheral device usage.

7. The system of claim 5, wherein the peripheral power management component determines usage of the peripheral devices by monitoring one or more attributes of the mobile device and the state of the peripheral devices.

8. The system of claim 1, the peripheral power management component generates at least one power management schema during a learning phase, wherein the peripheral power management component logs a set of mobile device attributes and peripheral device states, and generates the power management schema based at least in part on the logged attributes and peripheral device states.

9. A method for facilitating power management in mobile devices, comprising:
   providing power to a processor for communicating with a set of peripheral devices;
   tracking usage of at least one of the peripheral devices associated with a set of observed mobile device attributes including a status of at least one application; and
   managing the power based on the tracked usage of the at least one of the peripheral devices by one of: maintaining communication with at least one of the peripheral devices and disabling communication with at least one of the peripheral devices, based at least in part on the set of observed mobile device attributes and at least one peripheral device power management schema.

10. The method of claim 9, further comprising setting a state of the peripheral device.

11. The method of claim 9, the power management schema includes machine learning.

12. The method of claim 11, the machine learning includes at least one of: a decision tree, a naïve Baye, a Bayesian network, a neural network, a fuzzy logic model, or a probabilistic classification model providing different patterns of independence.

13. The method of claim 11, further comprising generating the decision trees based on a matrix, the matrix includes at least one of the set of observed mobile device attributes, or a set of observed peripheral device states.

14. The method of claim 9, further comprising adapting the power management schemas based on at least one of: tracked usage of peripheral devices, predicted usage of the peripheral devices, or observed attribute values associated with peripheral device usage.

15. The method of claim 13, further comprising determining usage of the peripheral devices by monitoring one or more attributes of the mobile device and the state of the peripheral devices.

16. The method of claim 9, further comprising generating at least one power management schema during a learning phase, including logging a set of mobile device attributes and peripheral device states, and generating the power management schema based at least in part on the logged attributes and peripheral device states.

17. A system for power management in mobile devices, comprising:
   means for providing power to a processor for communication with a set of peripheral devices; and
   means for tracking usage of at least one of the peripheral devices associated with a set of observed mobile device attributes including a status of at least one application and managing the power expended based on the tracked usage of the at least one of the peripheral devices by one of: maintaining communication with at least one of the peripheral devices and disabling communication with at least one of the peripheral devices, based at least in part on the set of observed mobile device attributes and at least one peripheral device power management schema.

18. The system of claim 17, further comprising means for at least one of generating, or modifying the schemas based on at least one of a set of observed mobile device attributes, or a set of observed peripheral device states.

19. The system of claim 17, the power management schema includes at least one artificial intelligence technique.

20. The system of claim 19, the artificial intelligence techniques include at least one of: a decision tree, a naïve Bayes, a Bayesian network, a neural network, a fuzzy logic model, or a probabilistic classification model providing different patterns of independence.

* * * * *